Patented Sept. 23, 1952

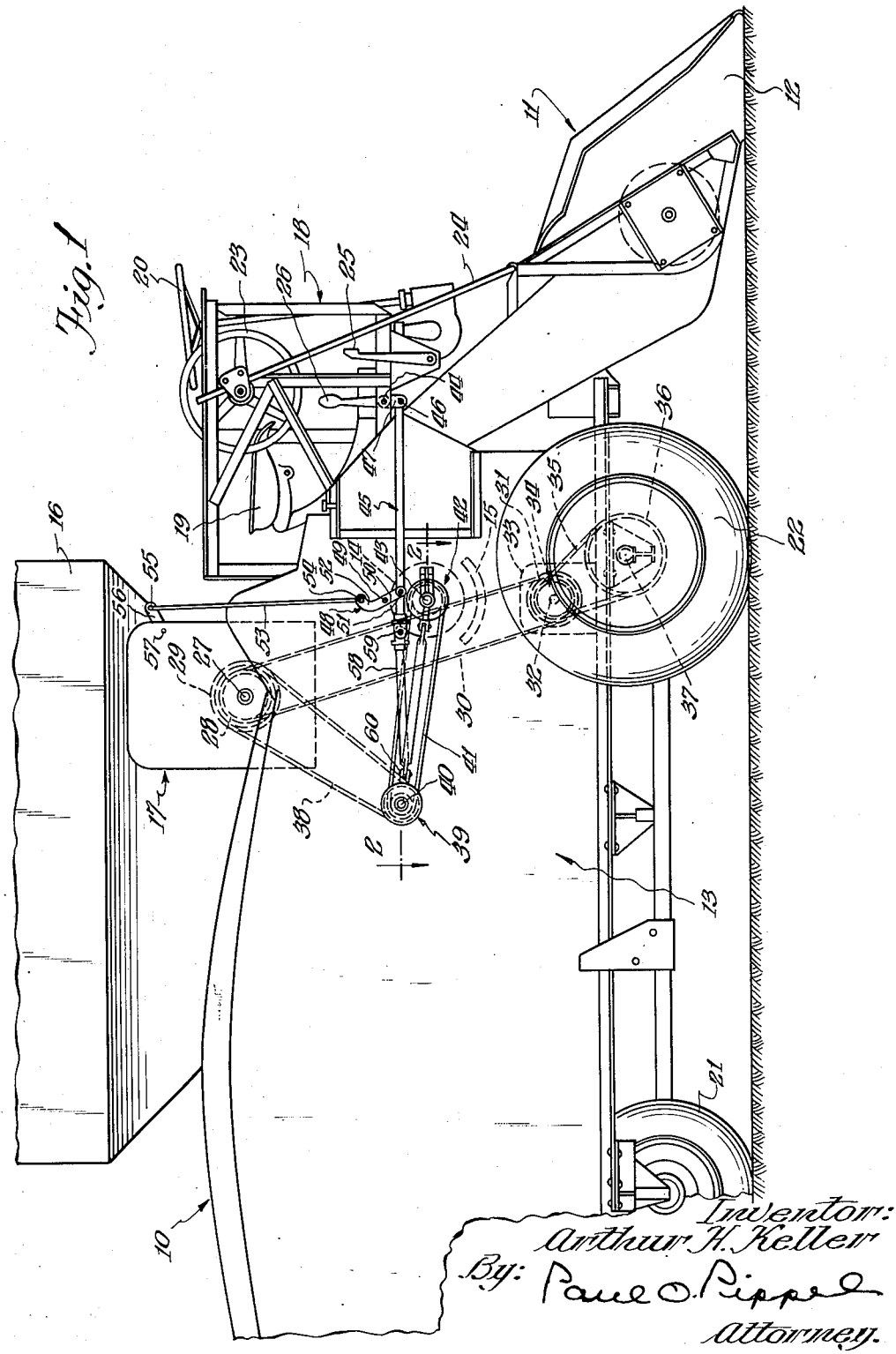

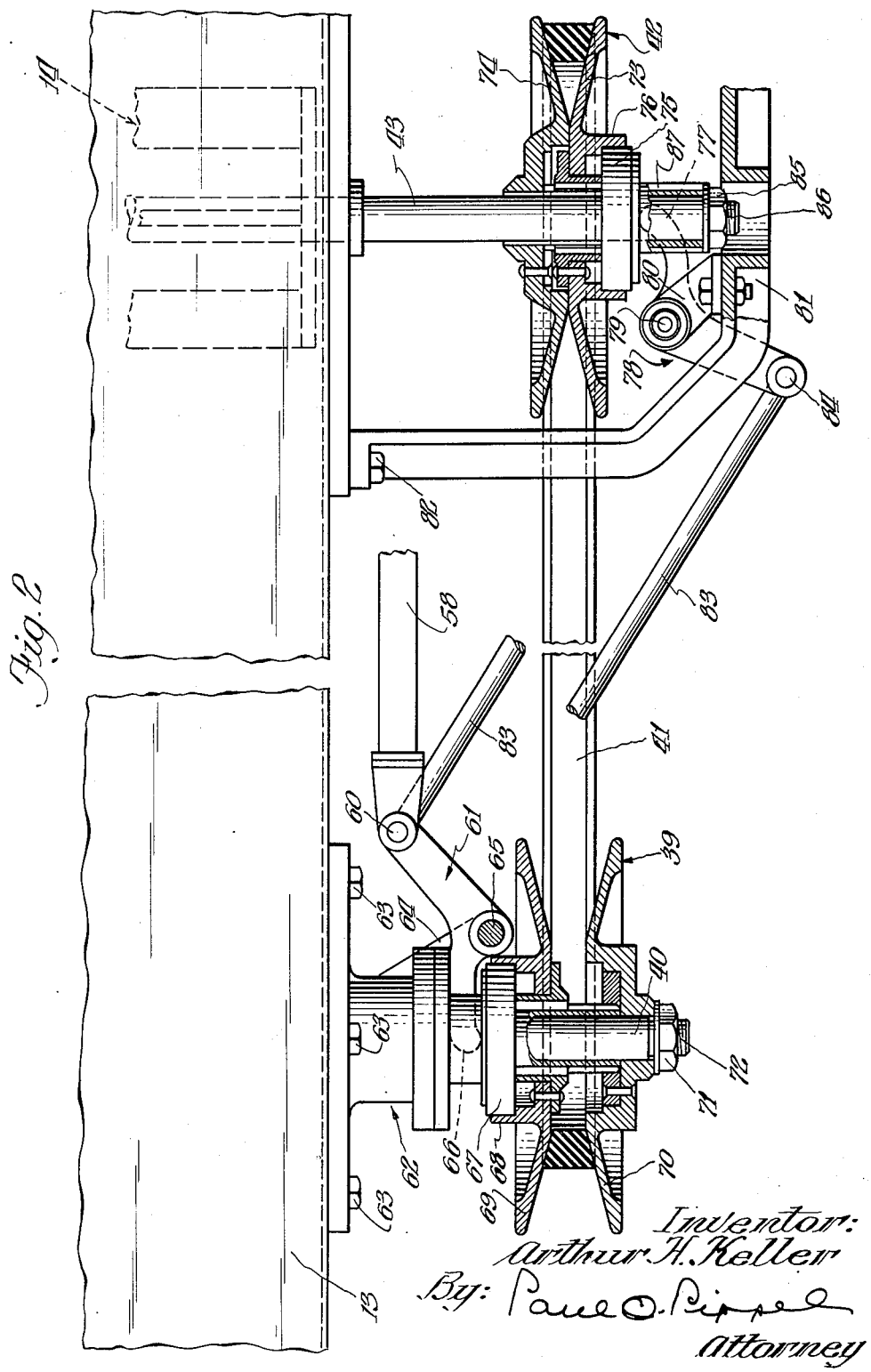

2,611,227

UNITED STATES PATENT OFFICE 2,611,227

COMBINATION VARIABLE SPEED PULLEY AND ENGINE THROTTLE CONTROL FOR HARVESTER THRESHERS

Arthur H. Keller, Moline, Ill., assignor to International Harvester Company, a corporation of New Jersey Application January 19, 1951, Serial No. 206,883

8 Claims. (Cl. 56—20)

This invention relates to a combination variable speed pulley and engine throttle control for harvester threshers.

A principal object of this invention is the provision of a harvester thresher or the like having single engine means for effecting forward movement of the vehicle and operation of the threshing cylinder, and means cooperating therewith for automatically maintaining constant rotational speed of the threshing cylinder and related thresher parts regardless of changes of vehicle ground speed.

An important object of this invention is the provision of means in a harvester thresher for simultaneously shifting the transmission drive ratio for a threshing machine mechanism and including the cylinder upon the change of engine throttle control.

Another important object of this invention is to supply a variable speed V-belt transmission for combine thresher mechanisms and a single control lever for shifting the drive ratio between the driving V-belt pulleys simultaneously with change in engine acceleration.

Another and still further important object of this invention is to provide means in a harvester thresher for maintaining constant speed of the threshing mechanisms and particularly the cylinder regardless of the forward speed of the vehicle.

Other and further important objects will become apparent from the disclosures in the following specification and accompanying drawings.

In the drawings:

Fig. 1 is a side elevational view of a self-propelled harvester thresher incorporating the principles of this invention.

Fig. 2 is a sectional view taken on the line 2—2 of Fig. 1.

Harvester threshers, including self-propelled harvester threshers, are required to operate at relatively slow forward ground speeds. Threshing cylinders must run at a relatively constant speed in order to accomplish most effective grain and husk separation. When the threshing elements including the cylinder are driven at various speeds, the result is sporadic threshing wherein there is not a clean separation of grain and trash and there is a serious tendency for the grain to clog. It has thus been found essential to provide separate means for operating the forward speed of a harvester thresher and the driving of the thresher elements. The present machine accomplishes a relatively constant rotational drive for the threshing cylinder and constant drive for the other thresher mechanisms despite various changes in ground speed although there is but a single source of power for effecting forward harvester thresher speed and drive of the thresher elements. It should be understood that this device would be applicable to other agricultural machines wherein it is desired to maintain a device with constant driven speed regardless of changes in ground speed.

The reference numeral 10 indicates generally a self-propelled harvester thresher or the like. The harvester thresher 10 includes a harvesting unit 11 comprising a scoop-shovel type of platform 12 for the purpose of receiving and elevating grain into a separator or threshing mechanism 13. The separator includes many driven thresher elements, and among other things, a threshing or rotating cylinder 14. The cylinder 14 is rotated and, in cooperation with a concave 15, causes separation of the grain from the husks and trash. The self-propelled combine further includes a grain receiving tank 16, an engine 17, and an operator's platform 18. A seat 19 is provided on the platform 18 and in close proximity thereto is a steering wheel 20 arranged and constructed to cause angular movement of the small rear wheels 21 of the combine. The forward end of the machine is supported by relatively large traction wheels 22 which are adapted to receive their rotational drive from the single engine 17. A platform lifting mechanism in the form of a hand engaging wheel 23 and a link 24 is also mounted on the operator's platform 18 as are brakes 25 and an engine throttle control lever 26.

The single engine or source of power 17 is adapted to impart rotation to the traction wheels 22. The engine is provided with a drive shaft 27 which carries V-belt pulleys 28 and 29 for concurrent rotation. The V-belt pulley 28 has a V-belt 30 carried thereon, and the belt at its other end is mounted on a V-belt pulley 31. The pulley 31 is mounted on a shaft 32 journaled in a bracket member 33 on the separator portion of the combine. The shaft 32 is additionally provided with a V-belt 34 of smaller diameter than the pulley 31, and by means of a V-belt 35 rotational drive of the shaft 32 is imparted to a V-belt pulley 36 mounted on the wheel shaft 37 of the traction wheel 22. The V-belt pulleys 31 and 34, in combination with the shaft 32 and bracket 33, constitute a transmission or a speed reduction device wherein drive from the engine 17 is delivered with suitable power to the driven traction wheels 22.

A V-belt 38 is mounted on the V-belt pulley 29 and imparts rotation to an adjustable V-belt pulley 39 which is carried on a shaft 40. The details of this pulley 39 are best shown in Fig. 2. A V-belt 41 is carried on the pulley 39 and delivers rotational power to a second adjustable V-belt pulley 42 which in turn is mounted on the shaft 43. The shaft 43 is also the shaft on which the threshing cylinder 14 is mounted. Thus rotation of the shaft effects rotation of the cylinder and other threshing elements within the separator mechanism 13 of this combine 10.

The throttle control lever 26 is pivoted at 44 on the platform structure 18. A link 45 is fastened at 46 to a depending portion 47 of the operating lever 26. A bell crank member 48 is pivoted at 49 to the side wall of the separator 13. One arm 50 of the bell crank 48 is pivotally attached at 51 to the link 45. The second arm 52 of the bell crank 48 carries a substantially vertically disposed link 53 by reason of a pivotal connection at 54. The upper end of the link 53 is pivotally attached at 55 to a lever arm 56 which constitutes the throttle control of the engine 17. The throttle arm 56 is shown as having a pivotal attachment at 57 on the engine 17. It is thus apparent that fore and aft swinging movement of the lever arm 26 will accomplish a direct shifting of the throttle lever arm 56 to thus control the speed at which the engine 17 is driven. The link 45 continues rearwardly beyond the pivotal attachment to the bell crank 48 at 51 as indicated by the numeral 58. A universal joint 59 is shown as constituting a part of the overall link 45. The end portion 58 of the link 45 is thus swingable throughout a considerable range by reason of the universal joint 59. The end of the link 58 is shown fastened by means of a pivotal attachment at 60 to a shifter fork 61.

As best shown in Fig. 2, the pulleys 39 and 42 are of the type in which the wall spacings may be varied. The shaft 40 is a stub shaft mounted in a supporting housing 62 which in turn is mounted on the side wall of the thresher 13 by means of bolts or the like 63. The housing 62 includes a bracket 64 arranged and constructed to pivotally carry the shifter fork 61 as shown at 65. The fork 66 of the shifter fork 61 projects inwardly adjacent a bearing member 67 which is mounted within an internal sleeve 68 of the shiftable portion 69 of the pulley 39. Thus as the link 58 is moved forwardly and rearwardly by reason of movement of the lever arm 26, the pulley half 69 is moved toward and away from the stationary portion 70 of the pulley 39. A nut 71 engages a threaded extension 72 of the shaft 40 maintaining the pulley half 70 in fixed position on the shaft.

The V-belt pulley 42 similarly has a shifting portion 73 and a stationary portion 74. A bearing member 75 is carried in an internal sleeve flange 76 of the pulley half 73 and is adapted to receive contact by a fork 77 of a shifter fork member 78. The shifter fork member 78 is pivotally mounted at 79 on a stationary bracket 80 forming part of a superstructure 81 which projects outwardly from attachment to the side wall of the separator 13 by means of bolts or the like 82.

A diagonally disposed link 83 has one end thereof pivotally fastened at 60 to the shifter fork 61 and the link 58 and its other end is pivotally fastened at 84 to the shifter fork member 78. It is thus apparent that longitudinal movement of the link mechanism 45—58—59 causes arcuate movement of the fork 66 to effect a shifting of the portion 69 of the V-belt pulley 39 to thus vary the spacing between the wall portions 69 and 70 of that pulley whereupon the V-belt 41 will ride either lower or higher within the pulley dependent upon the direction of movement of the shifter fork 66. It should thus be apparent that the connecting link 83 between the shifter forks 61 and 78 will cause a simultaneous movement of the shifter fork 77 and thus a shifting of the portion 73 of the V-belt pulley 42. Inasmuch as the shiftable pulley half 69 is on the opposite side from the shifting pulley half 73, the V-belt pulleys 39 and 42 will be simultaneously opened and closed respectively throughout the same distance. In other words, as the pulley 39 is opened, the pulley 42 will be closed and conversely when the pulley 39 is closed, the pulley 42 will be opened. This insures that a fixed length of V-belt 41 will remain under proper tension throughout all changes of drive ratio between the pulleys 39 and 42.

The universal joint 59 permits sufficient freedom of movement of the link 58 to provide for the necessary change in direction in accomplishing the shifting of the shifter forks 61 and 78. A nut 85 engages a threaded extension 86 of the shaft 43 and abuts a splined sleeve 87 upon which the pulley half 73 is axially slidable. The variable speed V-belt pulley transmission of this invention is shown in greater detail in presently pending applications Serial No. 135,557, filed December 29, 1949, now Patent Number 2,573,937, dated June 6, 1951, and Serial No. 183,797, filed September 8, 1950.

In operation, an operator of the combine of this invention is seated in the seat 19 on the platform 18 and after starting the engine 17 controls forward movement of the harvester thresher through fields of either standing or windrowed grain by reason of the steering wheel 20. The scoop-shovel type of platform 12 may be vertically adjusted so as to vary the height of cut or pick-up by means of rotating the adjusting wheel 23 whereupon the connecting link 24 attached at its lower end to the platform 11 will cause either upward or downward movement of the scoop shovel about its pivotal mounting 87 on the separator 13. Acceleration or deceleration of the engine 17 is accomplished by shifting of the lever 26 whereupon the throttle lever 56 of the engine is directly moved to cause the desired change in speed of the engine. When the grain in a field is particularly heavy, it is quite essential that the forward movement of the harvester thresher be extremely slow in order that the harvesting and threshing mechanisms may handle the quantity of grain and cause efficient threshing. As it has been explained previously, the engine 17 through a suitable transmission mechanism 31 to 34 inclusive drives the ground engaging traction wheels 22, and thus change in engine speed directly varies the ground speed of the entire self-propelled combine. Similarly the engine 17 controls the drive to the threshing cylinder 14 and other driven thresher elements. It is quite essential that the threshing mechanism and particularly the cylinder continue to be driven and rotated at a constant speed regardless of the forward speed of the vehicle. It would be impossible to bring about satisfactory separation of grain and husks if the threshing mechanism were to be slowed down commensurate with the forward speed of the vehicle. Obviously, with a greater quantity of grain being passed through the harvester thresher as evidenced by the slowing down of the forward speed of the machine, the increased load could not be handled by slower speed of the threshing mechanism, and, further, it has been found from continued experiments that clean separation occurs only throughout a small range of speeds of the threshing mechanism. Thus, means has been provided in the present invention which is directly associated with the throttle control lever 26 to simultaneously shift the drive ratio between the V-belt pulleys 39 and 42 in an amount sufficient to automatically compensate for changes in speed of the engine 17 to maintain a constant speed of the threshing mechanism and particularly of rotation of the threshing cylinder 14. The link 45, which joins the lower extension 47 of the lever arm 26 with the bell crank 48 for operation of the engine throttle arm 56, continues rearwardly in the form of a universal joint 59 and an extension link 58. The link 58 joins the shifter fork 61 of the variable V-belt pulley which carries engine rotation to the threshing mechanism. Inasmuch as the link 45 is supported at spaced points 46 and 51, the links 45 and 58 will thus not be permitted to fall at the universal joint 59 but will rather remain on a substantially horizontal level to provide for easy and direct shifting of the pulley spacings of the pulleys 39 and 42 simultaneously with the change in speed of the engine 17. The device of this invention is so arranged that when the engine 17 has its speed reduced by shifting of the throttle arm 56 there will be suitable change in the V-belt drive mechanism 39—42 to maintain a constant speed of rotation of the pulley shaft 43 and thus also the threshing mechanism and cylinder 14.

Numerous details of construction may be varied throughout a wide range without departing from the principles disclosed herein, and I therefore do not propose limiting the patent granted hereon otherwise than as necessitated by the appended claims.

What is claimed is:

1. In a thresher, a drive mechanism comprising an engine, a throttle control for said engine, a threshing mechanism, a variable spaced V-belt transmission interposed between said engine and said threshing mechanism, shifting means for effecting change in the ratio of V-belt transmission, a rockable lever, and link means joining said rockable lever with said throttle control and with said shifting means for simultaneously changing engine speed and ratio of V-belt transmission to said threshing mechanism by rocking said rockable lever.

2. A device as set forth in claim 1 in which said variable speed V-belt transmission includes spaced apart V-belt pulleys, each of said V-belt pulleys having a shiftable portion and a stationary portion, said shiftable portion shiftable toward and away from said stationary portion, said shifting means including a shifting fork positioned adjacent each of said pulleys and arranged and constructed to move said shiftable portion of each V-belt pulley, said shiftable portion of each of said pulleys oppositely disposed, and a diagonal link joining each of said shifting forks.

3. A device as set forth in claim 2 in which said link means joins said diagonal link whereby movement of said rockable lever causes change in engine speed and simultaneously a change in the drive ratio of the variable speed V-belt transmission.

4. A device as set forth in claim 3 in which a universal joint is provided in said link means between said throttle control and said shifting means whereby compensation is had for various angular dispositions of the diagonal link and the link means.

5. In a self-propelled harvester thresher, a drive mechanism comprising an engine, a throttle control for said engine, ground wheels, a threshing mechanism, first means transmitting engine drive to said ground wheels, second means transmitting engine drive to said threshing mechanism, said second means including a variable speed V-belt transmission, shifting means for effecting change in the variable speed V-belt transmission, and lever and link means joining said throttle control and said shifting means for simultaneously changing engine speed and changing the ratio of V-belt transmission to said threshing mechanism.

6. A drive for threshing cylinders comprising a variable V-belt transmission, an engine, a throttle control for said engine, and operating means for simultaneously moving said engine throttle control and said variable speed V-belt transmission whereby the threshing mechanism may be automatically driven at a constant speed regardless of changes in engine speed, said variable speed V-belt transmission including spaced apart V-belt pulleys, each of said V-belt pulleys having a shiftable portion and a stationary portion, said shiftable portion movable toward and away from said stationary portion, and said operating means including a pivotally mounted lever arm, link means joining said pivotally mounted lever arm and said engine throttle control, shifter forks arranged and constructed to move each of said shiftable pulley portions toward and away from said stationary portions, and a continuation of said link means joining said shifter forks.

7. A device as set forth in claim 6 in which a universal joint is provided in said link means continuation.

8. An agricultural machine comprising an engine, a throttle control for said engine, ground wheels for said machine, an element to be rotated on said machine, first means transmitting engine drive to said ground wheels, said means transmitting engine drive to said element to be rotated, said second means including a variable speed V-belt transmission, shifting means for effecting change in the variable speed V-belt transmission, and lever and link means joining said throttle control and said shifting means for simultaneously changing engine speed and changing the ratio of V-belt transmission to said element to be rotated.

ARTHUR H. KELLER.

REFERENCES CITED

The following references are of record in the file of this patent:

UNITED STATES PATENTS

| Number | Name | Date |
|---|---|---|
| 1,085,108 | Cake | Jan. 27, 1914 |
| 1,388,449 | Brasseur | Aug. 23, 1921 |
| 2,215,831 | Heyer | Sept. 24, 1940 |
| 2,479,764 | Morton et al. | Aug. 23, 1949 |